United States Patent [19]
Weaver et al.

[11] 3,744,739
[45] July 10, 1973

[54] MULTIPLE IN-LINE DOCKING CAPABILITY FOR ROTATING SPACE STATIONS

[75] Inventors: Leon B. Weaver; Claude D. Pegden, Huntsville, Ala.

[73] Assignee: The United States of America as represented by the Administration of the National Aeronautics and Space Administration, Washington, D.C.

[22] Filed: Apr. 12, 1972

[21] Appl. No.: 243,374

[52] U.S. Cl............................................. 244/1 SD
[51] Int. Cl............................................. B64g 1/00
[58] Field of Search.................. 244/1 R, 1 SS, 1 SA, 244/1 SC, 1 SP

[56] References Cited
UNITED STATES PATENTS

| | | | |
|---|---|---|---|
| 3,144,219 | 8/1964 | Schnitzer | 244/1 SS |
| 3,300,162 | 1/1967 | Maynard et al | 244/1 SD |

Primary Examiner—Milton Buchler
Assistant Examiner—Jesus D. Sotelo
Attorney—L. D. Wofford, Jr., John R. Manning et al.

[57] ABSTRACT

The invention comprises means for hard docking a number of space vehicles with a rotating space station, and includes an axially positioned dome on which are located two intermeshing docking turrets. Each turret carries multiple docking ports extending radially from the turret axis, along which axis final access to the space station is accomplished through the turret hub. The turrets intermesh and rotate about their hubs, by means of a power source and suitable ring gears and bevel pinions, to successively position one of the docking ports on the axis of rotation of the space station, while the remaining ports are positioned off center, and alternately rotated into such docking position to receive an additional space craft. The arrangement allows docking in-line with the axis of rotation of the station, and multiple vehicles to be thus docked and then placed in holding position.

8 Claims, 5 Drawing Figures

3,744,739

MULTIPLE IN-LINE DOCKING CAPABILITY FOR ROTATING SPACE STATIONS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to docking facilities for space stations, and it deals more particularly with multiple in-line docking capability for rotating space stations of the type proposed to be used for space exploration.

The incorporation of angular rotation in planned advanced space stations or space bases, to provide artificial gravity, places special limitations on docking operations. If the entire station rotates, only two possible docking sites exist. These are the two ends of the station in line with the station axis of rotation. Operational limitations preclude docking with a port on the periphery of a rotating station. In most of the proposed designs, one of these two possible locations for a docking port is eliminated by the presence of a nuclear power source. Therefore, if additional docking sites are required, as is the case with large space stations, present day techniques require the incorporation of a complicated hub to permit parts of the station to be nonrotating, thereby providing additional sites for docking ports.

Therefore, it is apparent that faced with the alternatives of stopping the spin of a rotating space station to allow docking, and thus losing the artificial gravity created; providing, as an integral part of the space station, a stationary hub, which is impracticable due to the economy of space on such a station; or "in-line" docking capability, eliminating the need for a non-rotating space in the station; the logical choice is for in-line docking facilities. However, the prior efforts in this field have failed to come up with multiple in-line docking capability; that is, a multiple system which does not interfere with the normal traffic and operation of the station.

2. Discussion of Prior Art

The most pertinent prior art in this field is illustrated by the early U. S. Pat. No. 3,169,725 granted to Berglund, for an Erectable Modular Space Station; U. S. Pat. No. 3,144,219 to Schnitzer, for a Manned Space Station; and U. S. Pat. No. 3,300,162 to Maynard, et al., for a Radial Module Space Station While the references show that the concept of a space station having multiple docking ports is broadly old, the most pertinent reference noted was Berglund, which discloses a space station having a central hub 12 with a plurality of docking hatches 15 positioned at spaced intervals around the circumference thereof for docking a plurality of space vehicles to the station. A docking arm 24 connected to the hub dome is adapted to initially receive the spacecraft or vehicles and connect them to the docking hatches 15. Nevertheless, this patent merely suggests the principle of a non-rotating hub, taking up necessary space, or the possible stopping of the spin of the station in order that multiple vehicles might be docked.

The patents to Schnitzer and Maynard both disclose space stations having a single docking port or connection in line with the longitudinal axis of the space station to receive a single space vehicle. Additionally, the space station of the Maynard patent contains hanger space inside thereof for storing a plurality of space vehicles after they have been initially docked.

None of the foregoing references disclose a space station having two rotatable turrets which mesh in the manner described in the present invention, with multiple docking ports, such that a selected docking port may be rotated to a position in line with the longitudinal axis of the space station to dock, in sequence, several space vehicles.

SUMMARY AND OBJECTS OF INVENTION

Accordingly, it is a primary object of the present invention to provide means for hard docking a number of space vehicles with a rotating space station, without the necessity of stopping rotation of the station or providing a non-rotating portion of the station for such purposes.

An important feature in connection therewith is to provide an in-line docking capability adapted to receive in sequence a number of docking space vehicles.

A further object is to provide in a multiple in-line docking capability for space vehicles apparatus which will also allow hard line cabling and fluid umbilical connections between the docked vehicles and the rotating space station.

A feature to achieve this object is the provision of means whereby the docking ports may be readily moved into their in-line receiving position and, thereafter, displaced into a holding position without severing the connections of servicing cables and umbilicals.

The instant invention provides a multiple in-line docking capability for advanced space stations even while the entire station is rotating.

This concept, as depicted herein, consists of docking ports arranged on two meshed turrets. This arrangement permits positioning of any selected "active" docking ports in line with the axis of rotation of the station. The present invention is an arrangement of multiple docking ports which, when assembled on a space station or orbital space base, provides means for hard docking space vehicles or supply modules. The arrangement consists of a dome on which two intermeshed turrets are located. These turrets have hubs whose rotational axes intersect at 90° within the dome, and are provided with turret passages connected with access passages within the dome. Each turret carries three docking ports at the end of turret passages extending radially, equally positioned 120° about the axis of the turret hub. The turrets, when rotated together around each turret hub, successively, position one docking port on the axis of rotation of the space station while the remaining ports are positioned off center. The turrets are rotated around their hubs by suitable ring gears and bevel pinions which maintain the proper inter-meshed positions and allow a single power source within the dome to actuate indexing of the ports. Each docking port provides access to and from any spacecraft or vehicle docked to the port, through the interior of the turret and into the hub which there connects with enclosed passages through the dome to the interior area of the space station.

While they are not shown here, for clarity, suitable port covers and latching means would be provided at the port entrances such that the complete access route could be environmentally controlled even while indexing the turrets. Since neither turret need exceed 180° rotation, hard-line umbilicals and cables can be provided to each port for transfer of liquid or power from the visiting spacecraft or vehicle to the space station. Each individual port can have rotational docking rings which, when a port is positioned in the space station axis, can counter the rotation of the space station during a docking maneuver.

DETAILED DESCRIPTION OF THE INVENTION

Figure 3:
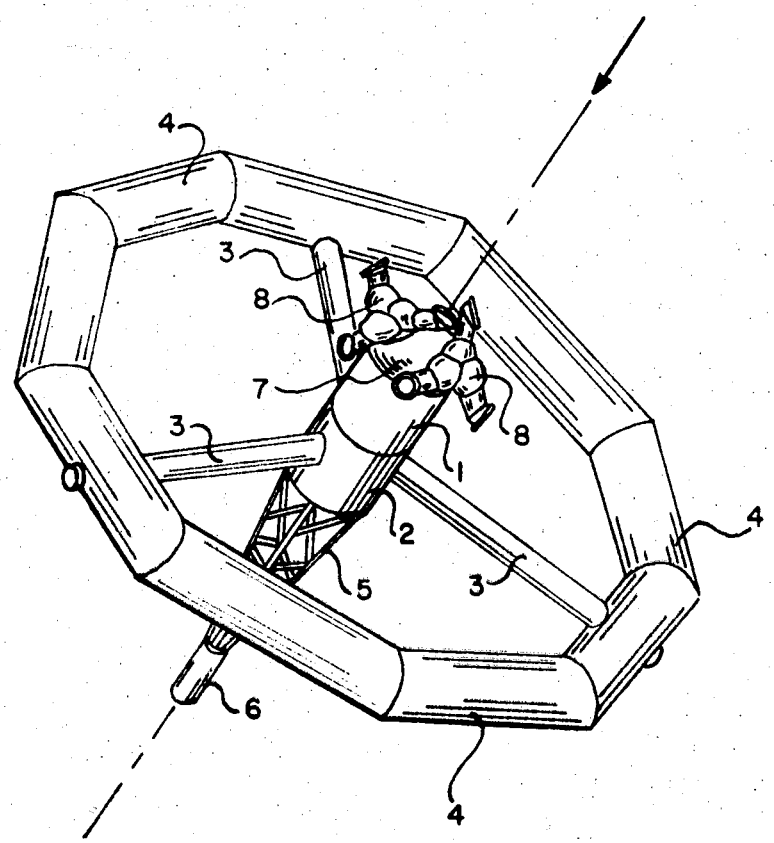
FIG. 3 is a perspective view of a space station as it would appear with the inter-meshed turrets installed.

Referring more particularly to the drawings, FIG. 3 depicts one of the embodiments of a standard space station having a central body portion 1 provided with a hub 2 from which radiate access passages 3 supporting living cells or compartments 4. Below the hub is located struts 5 which support a nuclear power source 6.

Affixed to the opposite end of the body portion 1 is a dome 7 supporting two rotatably mounted turrets 8 which comprise our invention.

Figure 1:
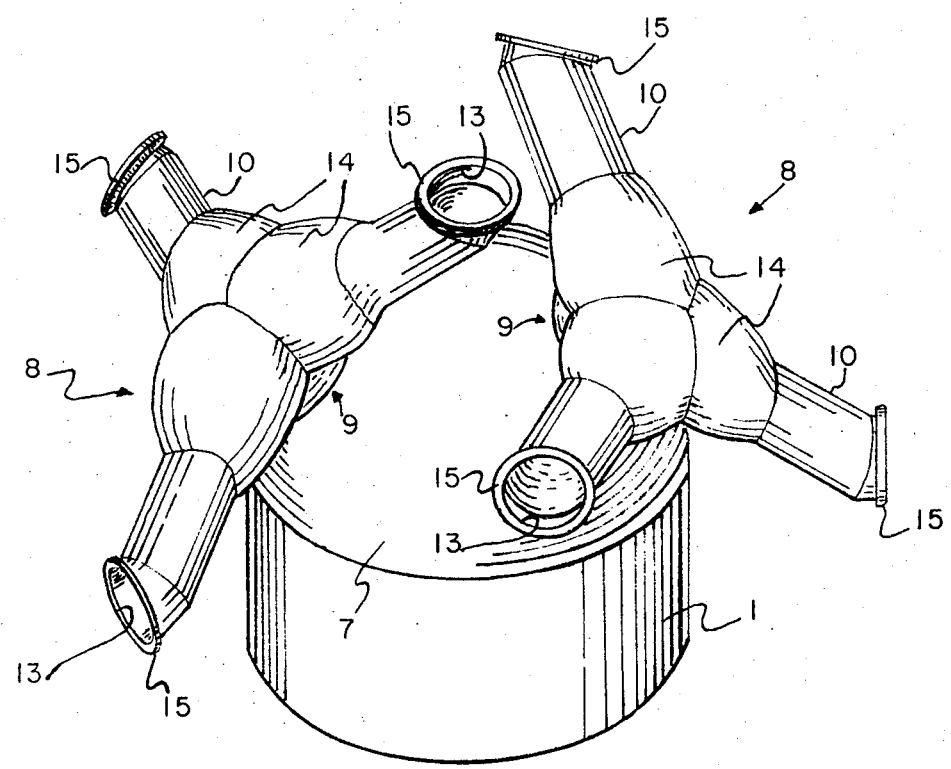
FIG. 1 is a perspective view of a preferred embodiment of the inter-meshed turrets of the invention mounted on the dome of a space station.
Figure 2:
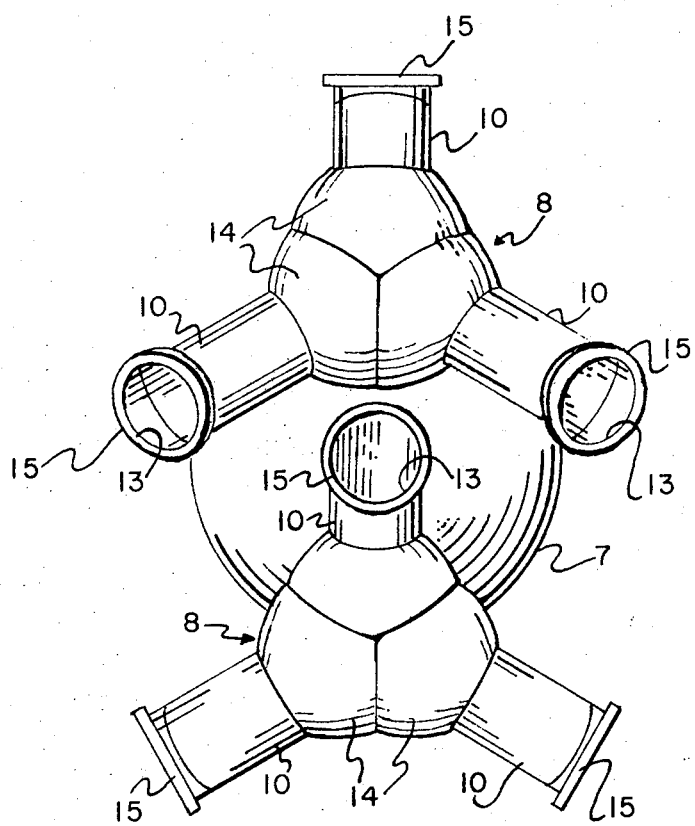
FIG. 2 is a plan view of the inter-meshed turrets, with one of them indexed on the rotational axis of the space station, as viewed from an approaching space vehicle traveling on the axis of the space station.

Multiple in-line docking capability is provided by the arrangement of the turrets 8 on the dome 7, as shown in FIGS. 1 and 2.

Figure 4:
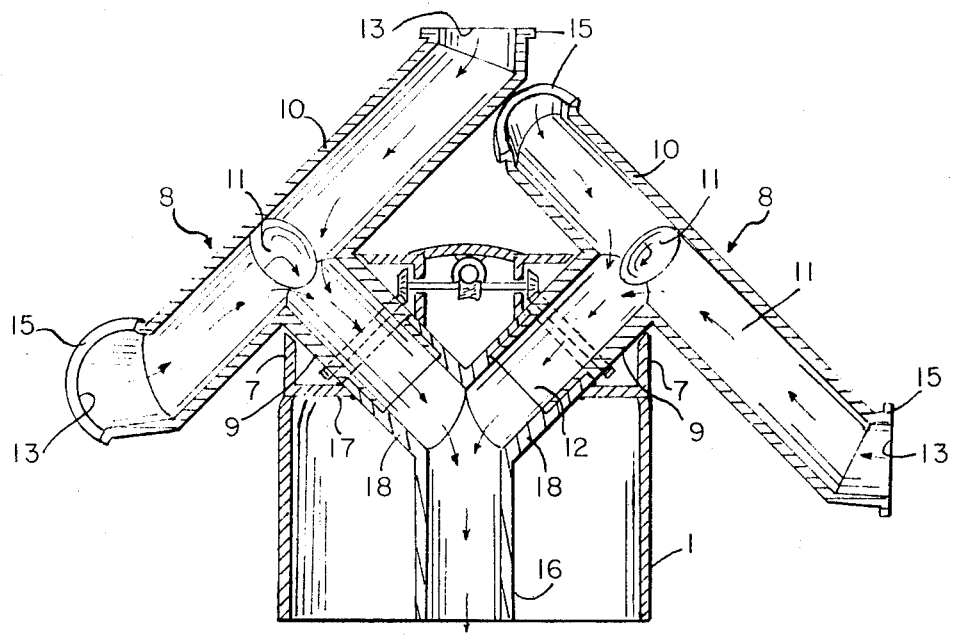
FIG. 4 is a partially diagrammatic sectional view of the turrets taken through the center of the dome and turrets, one in line, with the contoured outer fairing of the turrets removed for clarity.
Figure 5:
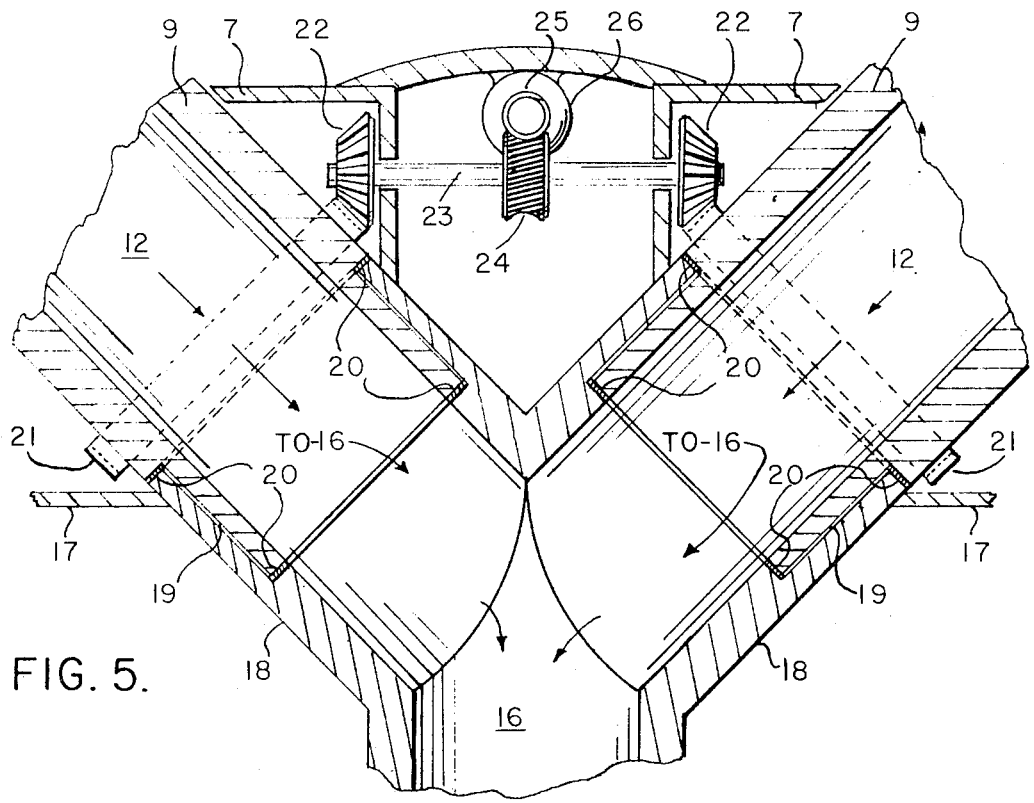
FIG. 5 is an enlarged partial sectional view of the turrets through the turret hubs and dome center, diagrammatically illustrating the tower movement system, with the fairing removed for clarity.

The turrets are mounted in inter-meshed position on the dome 7 with their hubs 9, as can best be seen in FIGS. 4 and 5, having their longitudinal axes intersecting at an angle of 90° within the dome. as indicated.

Referring to FIGS. 4 and 5, each turret is comprised of three radially extending arms 10, providing entrance passages 11 which communicate with access passages 12 in the hubs 9.

At the outer extremity of each arm 10 there is located a docking port 13 which is provided with a docking ring 15. Each of these docking rings would be of the rotating type, if desired, and would be provided with suitable latches and covers (not shown for clarity) to create the desired environment within the access area.

In the embodiment shown in FIGS. 1, 2 and 3 a fairing structure 14 is indicated as covering the turrets for protection and to reduce drag in the atmosphere.

Referring more particularly to FIG. 5, each of the turret hubs 9 is rotatably journaled in the Y-arm 18 of the station access tunnel section 16 by means of the use of a suitably sealed air or liquid bearing 19 and rings 20.

Circumscribing the turret hubs 9 are ring gears 21. These ring gears are in contact with a motive power system, diagrammatically shown, including bevel pinion gears 22 connected by a drive shaft 23 to a gear wheel 24. The gear wheel 24 is actuated by a worm 25 powered by a motor 26, mounted in the housing of the dome 7.

It can readily be seen that a proper environmental seal can be maintained for the inner area of the space station, since the Y-arms 18 extend through the bulkhead 17 of the dome 7 in sealed relation.

The turrets 8 intermesh, and are so mounted, with the bevel pinion gears 22 and ring gears 21, such that the movement of the turrets is synchronized to alternately index the various docking ports 13 of the turrets on the rotational axis of the space station as each turret is rotated along its own axis through an angle of 120°.

While, in the embodiment shown, we have chosen to use three turret arms on each turret, it will be apparent that by the proper use of spacing and angular increments, with the proper relationship of the axes of the turret, more than three docking ports on each turret could be provided. The concept of the invention as shown does not preclude the scope of our invention as including any appropriate number of multiple docking ports.

The turret and dome structure as shown in FIGS. 4 and 5 is with the fairing 14 as shown in FIGS. 1 and 2 removed in order that the structure of the apparatus may be made clear.

FIGS. 1 and 2 also show the structure without the necessary capture latches and docking port covers which would be used to maintain the proper environmental pressure within the docking apparatus in normal use in order to make the principal concept of the invention clear.

With a space vehicle approaching the space station in the direction of the arrow shown in FIG. 3, the view from the space vehicle about to dock is shown in FIG. 2.

To dock, a visiting space vehicle simply aligns itself with the station axis of rotation; "spins-up" to match the station rotation rate and then approaches the docking port to engage capture latches. (It should also be noted that the "spin-up" requirement can be eliminated by counter-rotating the extreme end of the docking port docking rings 15 which would contain the capture latches. After docking, this counter-rotation would be gradually lessened until the visiting space vehicle matches the station rotation rate.)

The other docking ports 13, with or without other modules attached, are temporarily positioned off to the side. The resulting imbalance of the space station can be instantaneously corrected by redistributing ballast such as water between tanks within the station. (A system of this type would already be required to counteract the effects of crew motion within the station.) As soon as the new space vehicle, or module, is hard-docked, the turrets can be rotated to bring any other docking port into the "active" position in-line with the station axis of rotation. In this manner, a number of space vehicles could be docked with the station and held off-center in an obvious holding position.

It can be seen that this concept permits hard-line cabling and fluid umbilical connections across the station-turret interface, since the rotational requirements to bring any docking port to the active position never exceed 180° from any arbitrarily selected neutral position. In this manner, liquids may be transferred by hard-line directly from the docked vehicle or module to various points within the station. By comparison, hard-line connections cannot easily be made at the present time across a continually rotating hub such as is presently required between rotating and non-rotating portions of a large space station.

By closing off the unused docking ports with appropriate covers, all connecting passageways can be pressurized; the normal mode for transfer of equipment and personnel is a shirtsleeve. The transfer path goes from each docking port through the turret axis of rotation. Thus transfer to a docked module is independent of the turret's orientation, and could, in fact, be accomplished even during docking port repositioning. The invention described appears to be simpler, more reliable, and less energy consuming than previously existing methods of providing multiple docking capability to rotating space stations.

This invention also lends itself to some applications on non-rotating stations. For example, this technique would readily provide multiple docking capability in cases where the docking approach corridor was limited to a single approach path by the space station geometry or a radiation field. Thus it will be seen that we have provided an apparatus which affords multiple in-line docking capability for rotating space stations, as well as others, suitably adapted to meet the objects and features hereinbefore set forth.

From the foregoing it will be seen that the invention is well adapted to attain all of the ends and objects, together with other advantages which are obvious and which are inherent to the structure.

It will be understood that certain features of any sub-combinations of the invention are of utility and may be employed without reference to other features and sub-combinations. This is contemplated by and is within the scope of the claims.

As many possible embodiments of the invention may be made without departing from the scope thereof, it is to be understood that all matters set forth or shown in the drawings is to be interpreted as illustrative and not in a limiting sense.

Having thus described our invention what is claimed is:

1. In a space station of the type having a centrally disposed body and hub portion with said station rotating upon the longitudinal axis thereof, apparatus providing multiple in-line docking capability comprising:
   a docking platform on said station disposed with an accessible longitudinal axis in-line with that of the rotating station;
   rotatable turrets on said platform having radially disposed docking arms;
   said turrets being disposed on said platform with their respective axes of rotation in spaced relation to the rotational axis of said platform to allow their synchronous operation;
   said docking arms having communicating docking ports thereon disposed such that the longitudinal axes of said ports may be selectively aligned with the rotational axis of said platform and station;
   means for rotating said turrets in synchronous relation to selectively in-line dock multiple vehicles on said turrets and hold them in docked off-line mode.

2. Apparatus of the character described in claim 1, wherein said docking platform comprises an arcuately configured dome positioned on said station hub axis such as to provide a head-on in-axis-line approach thereto.

3. Apparatus of the character described in claim 1, wherein said turrets have inwardly extending rotatable hubs supporting at their outer ends, and communicating therewith through the same, equidistantly spaced radial docking arms.

4. Apparatus of the character described in claim 1, wherein said turrets are disposed with their respective axes of rotation as extended intersecting within said station hub at right angles in the plane with, and on the axis of rotation of, the station hub, such that their radial arms can be intermeshed in rotation.

5. Apparatus of the character described in claim 1, wherein said docking ports are positioned at the outer extremity of said arms at such distance and with such angular pitch that the longitudinal axis of each port will be colinear with the rotational axis of the station as each docking arm is rotated into docking position.

6. Apparatus of the character described in claim 1, wherein said means for rotating said turrets in synchronous relation comprises a ring gear on each turret hub, bevel gears driving each of said ring gears connected by a common drive shaft, and driving means for said drive shaft, such that said turrets are rotated with their alternate arms in intermeshed relation, synchronously, to position their respective ports first in docking position and then in off-center holding position.

7. Apparatus as in claim 6, wherein said driving means for said shaft comprises a gear wheel on said common shaft, a worm gear working thereon, and a reversibly operable motor driving said worm gear.

8. Apparatus as in claim 1, wherein a continuous hard-line connection to said docking ports is provided by means of a centrally disposed access tunnel passage in said station hub, said passage having its longitudinal axis colinear with the rotational axis of said station, and provided at its upper end with extending Y-arms with passages communicating with the inner ends of said turret hubs and receiving the same.

* * * * *